3,130,238
CONVERSION OF PERHALO-OLEFINS

Fred N. Tlumac, Lake Jackson, Tex., now by change of name Fred N. Teumac, assignor to The Dow Chemical Company, Midland, Mich., a corporation of Delaware
No Drawing. Filed Apr. 20, 1962, Ser. No. 188,974
5 Claims. (Cl. 260—653)

This invention relates to the conversion of perhalo-olefins to alkyl halides. More specifically, the present invention relates to converting materials such as tetrafluoroethylene and the like to pentafluoroethane and the like in a relatively simple procedure.

It has now been discovered that perhalo-olefins, as defined hereinafter, may be converted to alkyl halides by reaction with water in the presence of a suitable catalyst.

Perhalo-olefins appropriate for the method of this invention are those aliphatic olefins having from two to three carbon atoms, containing halogens selected from the group consisting of chlorine and fluorine, a terminal $CF_2$ group, and a maximum of one chlorine atom in the molecule. Examples of appropriate perhalo-olefins are $C_2F_4$, $C_3F_6$, $C_2F_3Cl$, and the like.

In the method of the present invention, an appropriate gaseous perhalo-olefin to be converted is passed through water, thereby to provide a gaseous mixture of water and olefin. The resulting mixture is then passed through a reaction column having a catalyst therein. Reaction apparently takes place in the column at slightly elevated temperatures producing an alkyl halide, carbon and oxygen.

Suitable catalysts for the method of the present invention are cesium fluoride, rubidium fluoride, or mixtures thereof. These catalysts are usually mixed with a support medium which is inert to reactants and products of the reaction. Typical examples of such support media are potassium fluoride, sodium fluoride, aluminum oxide, and the like.

Water is apparently required in an amount such that the following typical reactions can occur:

$$5CF_2=CF_2 + 2H_2O \rightarrow 2C + O_2 + 4C_2F_5H$$

Of course, with other starting material, the equation may be slightly different. In any event, a convenient manner of providing adequate quantities of water for reaction is by passing the gaseous starting material through water maintained at a temperature such that the vapor pressure of the water is high enough to drive sufficient water into the gaseous starting material to form the reaction mixture. Generally, a water temperature of about 40 degrees centigrade will insure sufficient water for reaction. Less than a stoichiometric amount of water mixed with the perhalo-olefin will usually lower the conversion accordingly, while an excess of water is usually not detrimental to the process.

The rate at which the perhalo-olefin is passed through the water is calculable from the desired residence time of reactants in the reaction column. In general, a residence time of about one half second is required in order to effect appreciable conversions, while about one second's residence is required to give an economical conversion. A residence of about two and one half seconds is considered close to optimum. Longer residence times, even up to five minutes, apparently have no adverse effect on the process, but appear to be impractical.

In use, the catalyst is generally mixed with about five times its volume of support material. The mixture is usually pelletized for strength in a size which affords adequate surface area for contact. Pellets are then generally packed into a suitably sized column.

The packed column is usually heated to reaction temperature of from about 190 degrees centigrade to about 300 degrees centigrade. Lower temperatures usually result in lower conversion, while higher temperatures preferably result in undesirable side products. Temperatures from about 210 to about 280 degrees centigrade are usually employed. Atmospheric pressure is usually maintained within the reaction column. Lower pressures merely decrease the capacity of the column, while higher pressures are neither harmful nor necessary.

Carbon formed during the reaction causes some catalyst blockage as reaction continues, but the build up of carbon on the catalyst surface is usually slow, due to the oxidation of substantial amounts of the carbon to carbon monoxide and carbon dioxide in the column.

Products of the present process are dependent on the starting perhalo-olefin used. In general, the product is the alkyl halide formed by the addition of hydrogen fluoride across the double bond. When $C_2F_4$, $C_3F_6$, or $C_2F_3Cl$ are chosen as starting perhalo-olefins, the resulting products are $C_2HF_5$, $C_3HF_7$, or $C_2HF_4Cl$, respectively. Separation of product alkyl halide from the other constituents of the product stream may be accomplished by well known methods as, for example, by liquifying the alkyl halide to separate out oxygen, carbon dioxide, and carbon monoxide. The alkyl halide may then be dried by use of drying agent, if desired.

The method of the present invention may be better understood in light of the following examples which are set forth to illustrate, and are not to be construed to limit, this invention.

Example 1

Catalyst was prepared by mixing potassium fluoride and cesium fluoride in a ratio of five to one and forming pellets of the mixture. Catalyst pellets thus formed were packed into a nickel reactor which was wrapped with heating tape. Appropriate perhalo-olefin gas was released through a flow meter, thence through warm water (maintained at about 40 degrees centigrade) and into the reactor. Reaction time and temperature vary somewhat with the perhalo-olefin converted. All runs were made at atmospheric pressure. Results of several runs are tabulated below:

| Perhalo-olefin | Product | Residence Time (Secs.) | Reaction Temp. (° C.) | Conversion (Percent) |
|---|---|---|---|---|
| $C_2F_4$ | $C_2F_5H$ | 2.0 | 280 | 99+ |
| $C_3F_6$ | $C_3F_7H$ | 2.3 | 240 | 95 |
| $C_2F_3Cl$ | $C_2HF_4Cl$ | 1.8 | 215 | 92 |

Example 2

Pellets were formed of $Al_2O_3$ and coated with a concentrated rubidium fluoride solution. Final pellet composition was about thirty to one $Al_2O_3$ to RbF by weight. Using substantially the same procedure outline in Example 1 above, perhalo-olefins were converted to alkyl halides. Results of two representative runs are tabulated below:

| Perhalo-olefin | Product | Residence Time (Secs.) | Reaction Temp. (° C.) | Conversion (Percent) |
|---|---|---|---|---|
| $C_2F_4$ | $C_2F_5H$ | 2.0 | 240 | 20 |
| $C_2F_4$ | $C_2F_5H$ | 2.9 | 260 | 66 |

Various modifications may be made in the present invention without departing from the spirit or scope thereof, and it is to be understood that I limit myself only as defined in the appended claims.

I claim:
1. A method of converting a perhalo-olefin having from two to three carbon atoms, containing halogens selected from the group consisting of chlorine and fluorine, a terminal $CF_2$ group, and a maximum of one chlorine atom in the molecule, to an alkyl halide, comprising, reacting said perhalo-olefin with water at a temperature of from about 190 to about 300 degrees centigrade, in the presence of a catalyst selected from the group consisting of cesium fluoride and rubidium fluoride, and removing product from the reaction.

2. A method of converting a perhalo-olefin having from two to three carbon atoms, containing halogens selected from the group consisting of chlorine and fluorine, a terminal $CF_2$ group, and a maximum of one chlorine atom in the molecule, to an alkyl halide comprising, reacting said perhalo-olefin with water, at a temperature of from about 190 to about 300 degrees centigrade, in the presence, for a time greater than one half second, of a catalyst selected from the group consisting of cesium fluoride and rubidium fluoride, and removing product from the reaction.

3. A method of converting $C_2F_4$ to $C_2HF_5$, comprising reacting $C_2F_4$ with water, at a temperature of from about 190 to about 300 degrees centigrade, in the presence, for a time greater than one half second, of a catalyst selected from the group consisting of cesium fluoride and rubidium fluoride, and removing product from the reaction.

4. A method of converting $C_3F_6$ to $C_3HF_7$, comprising reacting $C_3F_6$ with water, at a temperature of from about 190 to about 300 degrees centigrade, in the presence, for a time greater than one half second, of a catalyst selected from the group consisting of cesium fluoride and rubidium fluoride, and removing product from the reaction.

5. A method of converting $C_2F_3Cl$ to $C_2HF_4Cl$, comprising reacting $C_2F_3Cl$ with water, at a temperature of from about 190 to about 300 degrees centigrade, in the presence, for a time greater than one-half second, of a catalyst selected from the group consisting of cesium fluoride and rubidium fluoride, and removing product from the reaction.

No references cited.